J. W. BRUCE.
MOWING MACHINE.
APPLICATION FILED SEPT. 6, 1913.

1,105,751.

Patented Aug. 4, 1914.

2 SHEETS—SHEET 1.

WITNESSES:

INVENTOR
J. W. Bruce.
By
ATTORNEY.

J. W. BRUCE.
MOWING MACHINE.
APPLICATION FILED SEPT. 6, 1913.
1,105,751.
Patented Aug. 4, 1914.
2 SHEETS—SHEET 2.
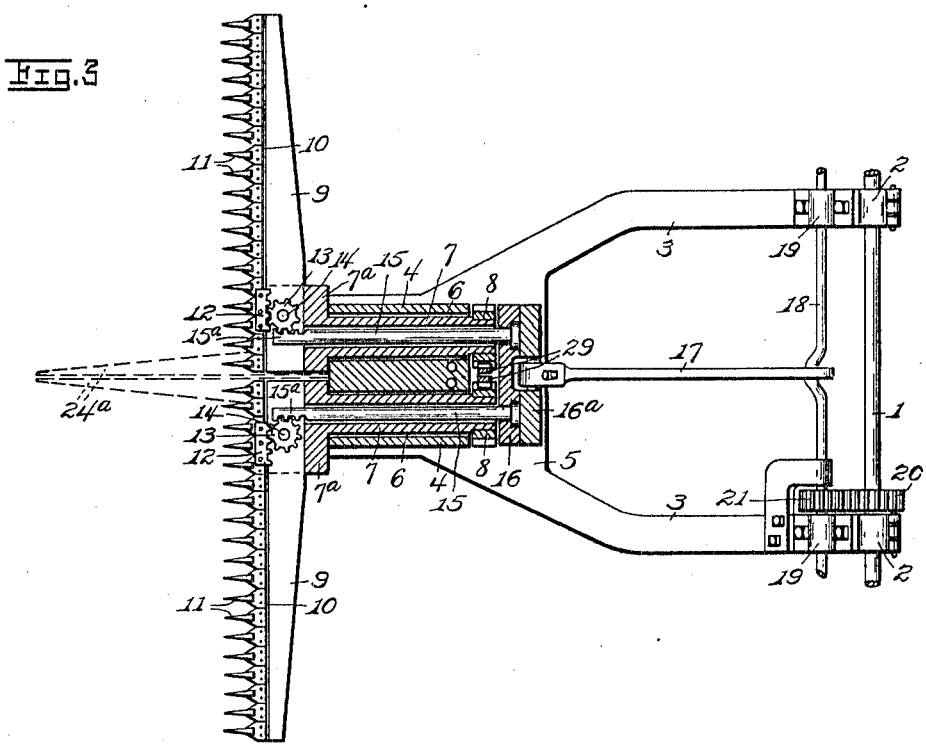
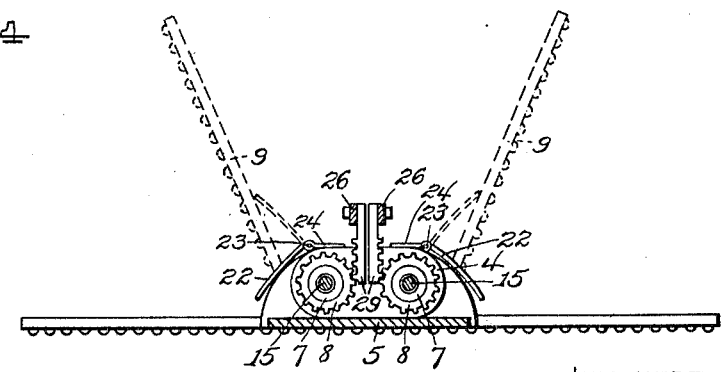
WITNESSES:
H. E. Arthur
L. D. Norris
INVENTOR—
J. W. Bruce
BY
N. E. Dunlap
ATTORNEY.

UNITED STATES PATENT OFFICE.

JAMES WESLEY BRUCE, OF OZARK, OHIO.

MOWING-MACHINE.

1,105,751.  Specification of Letters Patent.  Patented Aug. 4, 1914.

Application filed September 6, 1913. Serial No. 788,463.

*To all whom it may concern:*

Be it known that I, JAMES WESLEY BRUCE, a citizen of the United States of America, and resident of Ozark, county of Monroe, and State of Ohio, have invented certain new and useful Improvements in Mowing-Machines, of which the following is a specification.

This invention relates broadly to improvements in mowing machines, and specifically to a mower attachment for a self-propelled vehicle.

The primary object of the invention is to provide a mower attachment for traction vehicles, which possesses various marked and distinct advantages over the common types of horse-drawn mowing machines, and which is simple and durable in construction.

Other objects of the invention will hereinafter be pointed out or made apparent.

In describing the invention, reference is herein had to the accompanying drawings forming a part of this specification, in which—

Figure 1:
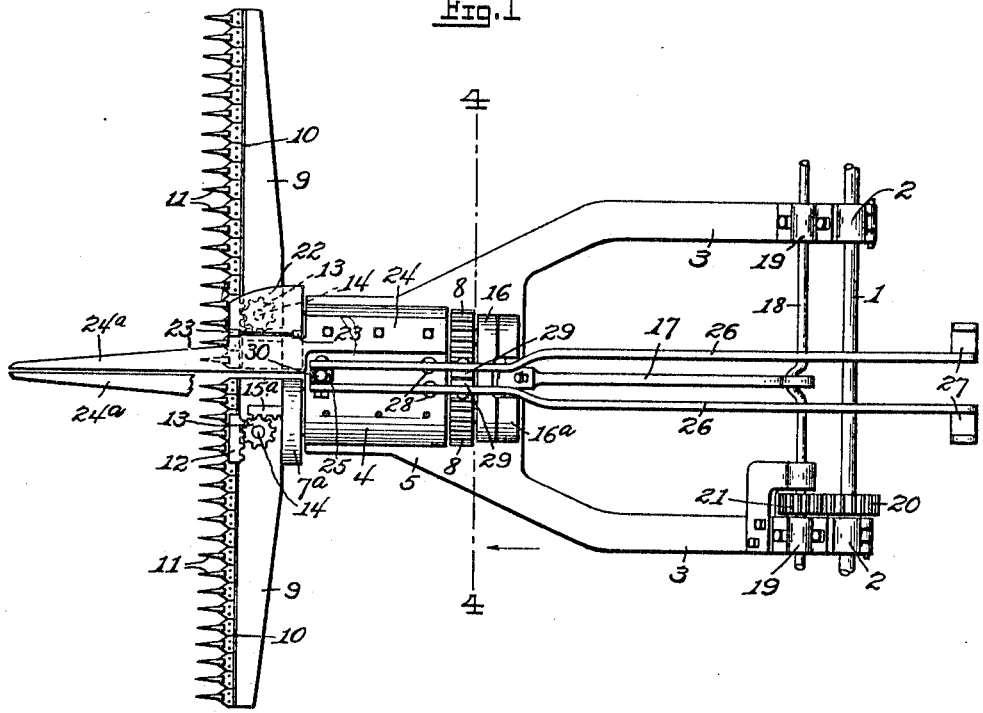
Figure 2:
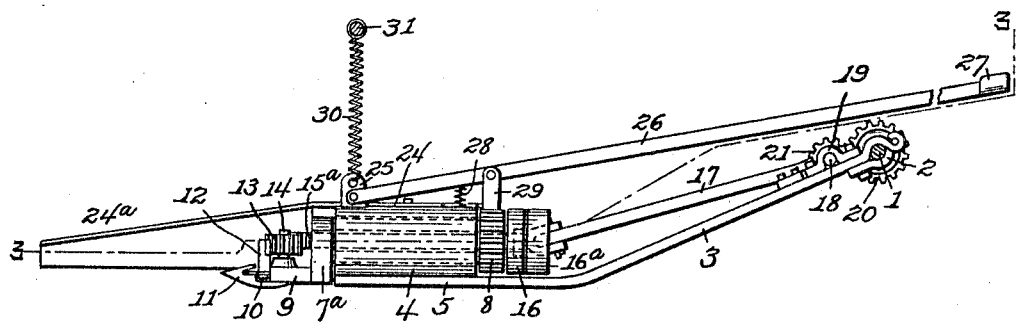

Figure 1 is a top plan view of the invention; Fig. 2 is a side elevation of the same; Fig. 3 is a substantially horizontal section of the same, taken on the line 3—3, Fig. 2; and Fig. 4 is a transverse section on the line 4—4, Fig. 1.

Referring to said drawings, in which like designating characters distinguish like parts throughout the several views 1 indicates a transverse drive-shaft carried by the frame of a self-propelled, or traction, vehicle. Connected in any appropriate manner to said vehicle, as by suitable clamps 2 which loosely encircle said shaft so as to permit of rotation of said shaft, are downwardly and forwardly inclined members 3, which support the parts constituting the essential features of the present invention. Said members 3 may either be integral with or attached to a stationary housing 4, or they may be formed integral with a plate 5 which underlies and supports said housing, as herein shown. Said housing has a pair of parallel longitudinal bores 6 extending therethrough, and mounted in each of said bores is a semi-rotatable sleeve 7 which has fixed upon its rear projecting end a gear or pinion 8, the purpose of which will presently be explained. Fixed to, or formed integral with, the projecting front end 7ª of each sleeve 7 is a laterally directed bar 9 which constitutes a support for a cutter-bar 10 of a common type and which is provided with the usual knife-guards 11. A toothed rack 12 of short length is carried by the rear edge of each cutter-bar 10 in operative engagement with a pinion 13 which is mounted upon an upright pin 14 carried by the supporting bar 9 at a suitable point. A toothed rack 15ª is also in operative engagement with each pinion 13, the same being formed adjacent to the front end of a rod 15 which is longitudinally movable through the interior of the adjacent sleeve 7. Said rods 15 have their rear ends suitably swiveled in a cross-head which is constituted, in the present instance, by rigidly connected members 16 and 16ª and which is connected either by an eccentric rod or pitman, as 17, (the latter being shown in the drawings) to a rotary shaft 18, whereby a reciprocatory motion is communicated to said rods 15 for imparting, through the intermediate mechanism, a like motion to the two cutter-bars 10. The shaft 18 is suitably journaled, as in bearings 19 provided on the members 3 and is driven in any appropriate manner, as by intermeshing gears 20 and 21 carried by the shafts 1 and 18, respectively.

In order to avoid the leaving of a narrow unmowed strip between the adjacent ends of the independently operating cutter-bars 10, means is provided for separating the grass in advance of the approaching cutters and for inclining the same laterally in opposite directions to bring it within the range of the knives of said cutter-bars. While any appropriate means for effecting such separation and inclination of the standing grass may be employed, I have herein illustrated a pair of oppositely disposed tapered sheet-metal fingers 24ª which extend forward to a point in advance of the cutter-bars, as shown in Figs. 1 and 2 and as indicated in dotted lines in Fig. 3. Aprons 22 hinged, as shown at 23 in Figs. 1 and 4, to plates 24 mounted on the housing 4, at opposite sides, overlie and shield the pinions 13, the arrangement of said aprons on hinges being designed to permit the bars 9 which support the cutter bars to be elevated without hindrance, as shown in dotted lines in Fig. 4 and as will now be explained.

Pivotally mounted upon the top of the housing 4 at points adjacent to the front end of the latter, as at opposite sides of a fixed upright lug 25, are the front ends of a pair of levers 26 whereby the independent elevation of the supporting bars 9 and the cutter bars 10 to upright, or semi-upright, positions, as shown in dotted lines in Fig. 4, may be effected, as when it is desired to raise one or both of said bars above an obstruction or for cross-country movement of the vehicle. The rear ends of said levers are located at a convenient point for manipulation by the operator or driver of the vehicle, and each is preferably provided with a foot pedal 27 for facilitating foot operation thereof. Said levers are yieldably supported in an elevated position, as shown in Fig. 2, by appropriate means, as by coil springs 28 interposed between said levers and the top face of the housing. Connected to each lever 26 is a rack-bar 29 which depends downward behind the rear end of the housing 4 and stands in mesh with the adjacent gear wheel or pinion 8, which as hereinbefore mentioned, is fixed upon the rear end of one of the sleeves 7. Thus, as is apparent, depression of one of the levers 26 against the resistance offered by the supporting springs 28, will, through the intermeshing rack-bar 29 and pinion 8 associated therewith, partially rotate in an inward direction the corresponding sleeve 7 which carries one of said bars 9, resulting in elevating the latter to an extent corresponding proportionately with the extent of the depression of said lever.

The housing 4 and associated mechanism is yieldingly supported in a position substantially on the level of the ground, as by means of a retractile coil spring 30 suspended from a fixed part, as the axle 31, of the vehicle. Thus, as the apparatus is advanced with forward movement of the vehicle, being pushed by the members 3, the same will readily rise and lower as slight ground elevations or depressions are encountered, and will consequently act to cut at a substantially even height above the ground.

It will be readily apparent that the members 3 may be connected to any suitable part of the vehicle other than the drive shaft 1, in which case the latter will not be subjected to other than strains incident to driving.

It will be obvious from the foregoing that the device is simple, durable, and efficient for the purpose for which it is designed; and that it is particularly adapted for use in level countries, where swaths of extreme width may be readily cut without interference due to abnormal unevenness or irregularity of the ground.

Having thus described my invention, what I claim as new, and desire to secure by Letters Patent, is—

1. The combination with a suitable support, of a housing, a pair of rotatable sleeves mounted in said housing, a laterally extending bar in fixed relation to each sleeve, a cutter-bar mounted on each of said bars, rods extending through said sleeves, means for imparting reciprocating motion to said rods, and means interposed between said rods and said cutter bars whereby motion imparted to the former is communicated to the latter.

2. The combination with a suitable support, of a housing, a pair of rotatable members mounted in said housing, a laterally extending bar in fixed relation to each of said members, a cutter-bar mounted on each of said bars, a gear-rack carried by each cutter-bar, a pinion mounted in operative engagement with each gear-rack, rods extending through said members and having gear-racks in operative engagement with said pinions, and means for imparting reciprocating motion to said rods.

3. The combination with a suitable support, of a housing, a pair of rotatable sleeves mounted in said housing, a laterally extending bar in fixed relation to each sleeve, a cutter-bar mounted on each of said bars, a gear-rack carried by each cutter-bar, a pinion mounted in operative engagement with each gear-rack, and reciprocable means operating through said sleeves and having engagement with said pinions whereby reciprocatory motion is communicated to said cutter-bars.

4. The combination with a suitable support, of a housing, a pair of rotatable sleeves mounted in said housing, a laterally extending bar carried by the front end of each sleeve, a cutter-bar carried by each of said bars, rods extending through said sleeves, means for imparting reciprocatory motion to said rods, means interposed between said rods and said cutter bars whereby motion imparted to the former is communicated to the latter, and means for rotating said sleeves to elevate the laterally extending bars.

5. The combination with a suitable support, of a housing, a pair of rotatable sleeves mounted in said housing, a laterally extending bar carried by the front end of each sleeve, a cutter-bar carried by each of said bars, rods extending through said sleeves, means for imparting reciprocatory motion to said rods, means interposed between said rods and said cutter bars whereby motion imparted to the former is communicated to the latter, pinions mounted on said sleeves, and manually operated means associated with said pinions whereby said sleeves are rotated to elevate the laterally extending bars.

6. The combination with a suitable support, of a housing, a pair of rotatable sleeves mounted in said housing, a laterally extending bar carried by the front end of each sleeve, a cutter-bar carried by each of said bars, rods extending through said sleeves, a cross-head in which the rear ends of said rods are swiveled, means for reciprocating said cross-head, means interposed between the front ends of said rods and said cutter-bars whereby motion imparted to the former is communicated to the latter, and means for elevating the laterally extending bars.

7. The combination with a suitable support, of a housing, a pair of rotatable sleeves mounted in said housing, a supporting member carried by the front end of each sleeve, cutter bars mounted on said supporting members and extending laterally in opposite directions, rods extending through said sleeves, means for imparting reciprocatory motion to said rods, a pinion mounted on each supporting member adjacent to the path of reciprocatory movement of the front end of each rod, a toothed rack formed on a side of each rod and in engagement with the adjacent pinion, and a toothed rack formed on each cutter-bar and in engagement with the adjacent pinion.

8. The combination with a suitable support, of a housing, a pair of rotatable sleeves mounted in said housing, a supporting member carried by the front end of each sleeve, cutter bars mounted on said supporting members and extending laterally in opposite directions, rods extending through said sleeves, means for imparting reciprocatory motion to said rods, a pinion mounted on each supporting member adjacent to the path of reciprocatory movement of the front end of each rod, a toothed rack formed on a side of each rod and in engagement with the adjacent pinion, a toothed rack formed on each cutter-bar and in engagement with the adjacent pinion, and means associated with each sleeve whereby the latter may be partially rotated for elevating the cutter-bar which is associated therewith.

9. The combination with a suitable support, of a housing, a pair of rotatable sleeves mounted in said housing, a supporting member carried by the front end of each sleeve, cutter bars mounted on said supporting members and extending laterally in opposite directions, rods extending through said sleeves, means for imparting reciprocatory motion to said rods, a pinion mounted on each supporting member adjacent to the path of reciprocatory movement of the front end of each rod, a toothed rack formed on a side of each rod and in engagement with the adjacent pinion, a toothed rack formed on each cutter-bar and in engagement with the adjacent pinion, means associated with each sleeve whereby the latter may be partially rotated for elevating the cutter-bar which is associated therewith, and a hinged apron in protecting relation to each of said pinions.

10. The combination with a suitable support, of a housing, a pair of rotatable sleeves mounted in said housing, a supporting member carried by the front end of each sleeve, cutter bars mounted on said supporting members and extending laterally in opposite directions, rods extending through said sleeves, means for imparting reciprocatory motion to said rods, a pinion mounted on each supporting member adjacent to the path of reciprocatory movement of the front end of each rod, a toothed rack formed on a side of each rod and in engagement with the adjacent pinion, a toothed rack formed on each cutter-bar and in engagement with the adjacent pinion, means associated with each sleeve whereby the latter may be partially rotated for elevating the cutter-bar which is associated therewith, and grass-parting means projecting forward in advance of the cutter bars at a point intermediate the latter.

In testimony whereof, I affix my signature in presence of two subscribing witnesses.

JAMES WESLEY BRUCE.

Witnesses:
H. E. DUNLAP,
L. D. MORRIS.

Copies of this patent may be obtained for five cents each, by addressing the "Commissioner of Patents, Washington, D. C."